UNITED STATES PATENT OFFICE.

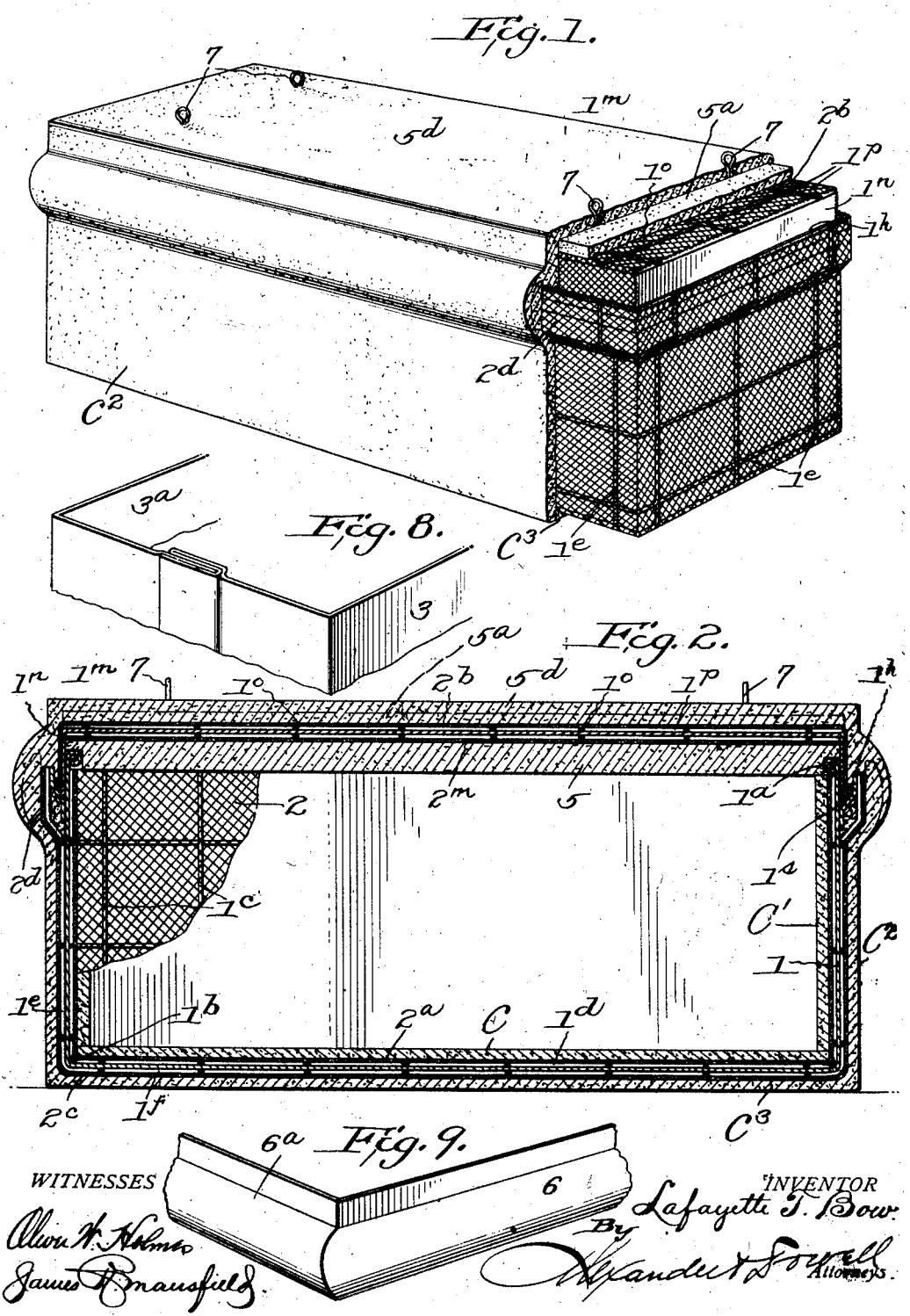

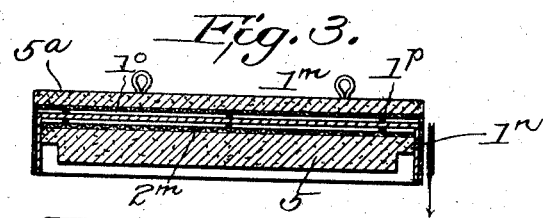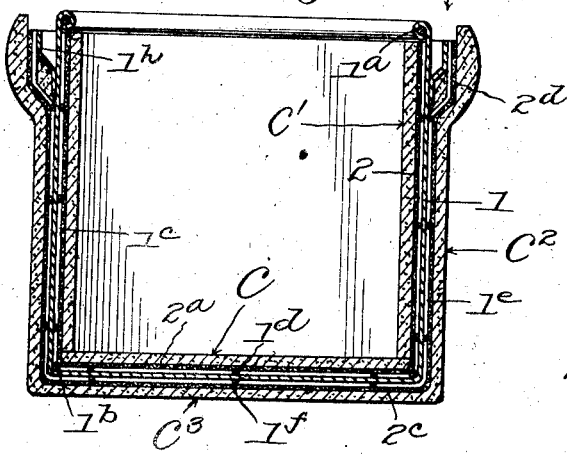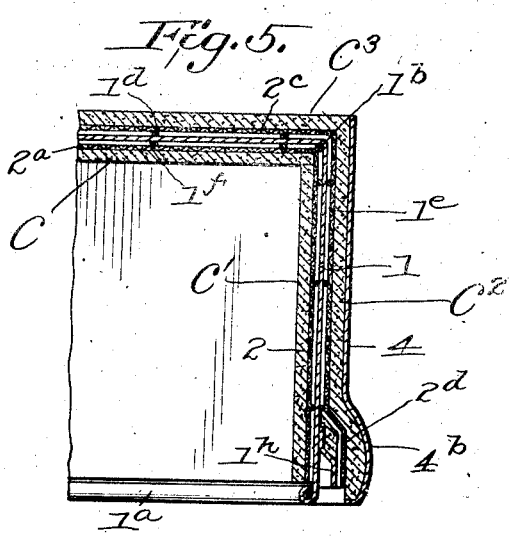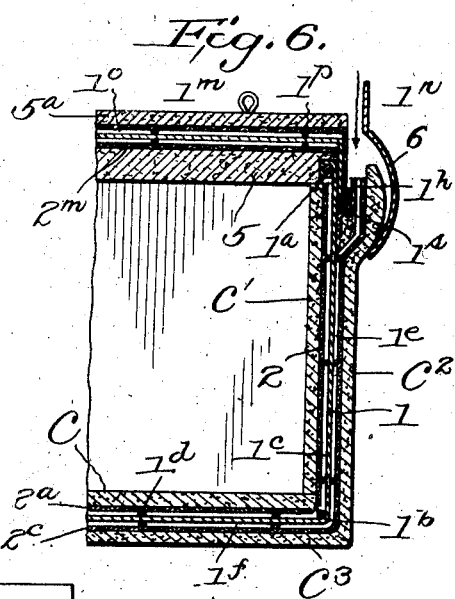

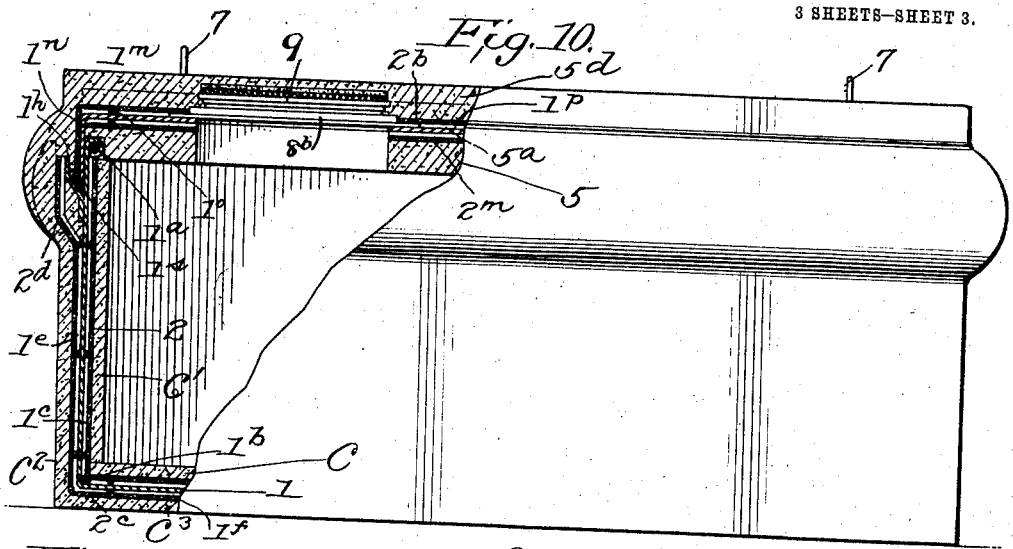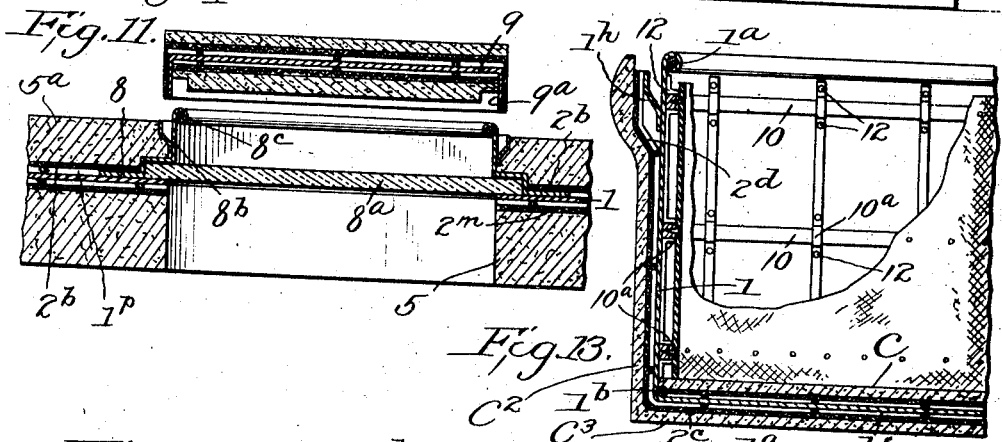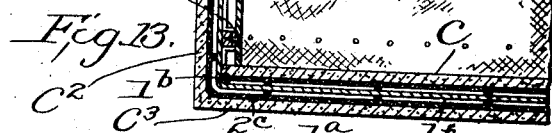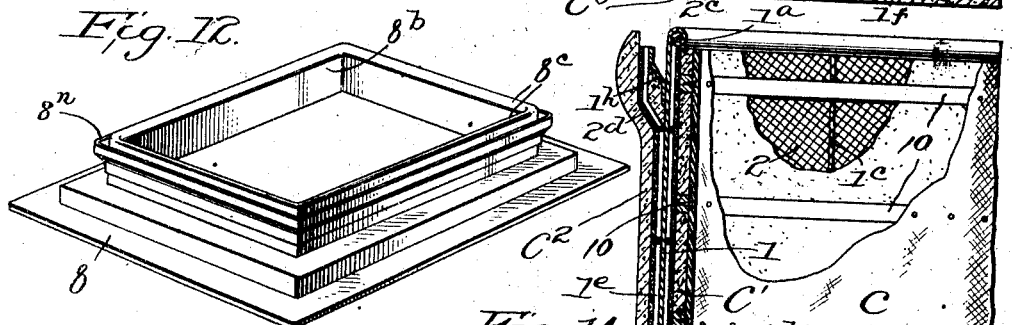

LAFAYETTE T. BOW, OF ARDMORE, OKLAHOMA, ASSIGNOR OF ONE-HALF TO DOCTOR B. VERNON, OF ARDMORE, OKLAHOMA.

CASKET OR COFFIN.

1,043,664.  Specification of Letters Patent.  Patented Nov. 5, 1912.

Application filed May 31, 1912. Serial No. 700,725.

*To all whom it may concern:*

Be it known that I, LAFAYETTE T. BOW, of Ardmore, in the county of Carter and State of Oklahoma, have invented certain new and useful Improvements in Caskets or Coffins; and I hereby declare that the following is a full, clear, and exact description thereof, reference being had to the accompanying drawings, which form part of this specification.

This invention is a novel improvement in caskets, or coffins, and sarcophagi; and its object is to provide a hermetically sealed reinforced concrete casket or sarcophagus which may be hermetically sealed so as to exclude air and water; and which furthermore will be practically secure against ghouls, and which will be particularly useful in places where, on account of the crowded condition of the cemetery, it is necessary to make successive interments in the same grave.

I will explain the invention with reference to the accompanying drawings which illustrate a practical embodiment of the invention, and will refer to the claims for summaries of the novel parts and features wherein the invention resides and for which I desire protection.

In said drawings—Figure 1 is a perspective view of the complete sarcophagus or casket with part of the exterior concrete covering broken away. Fig. 2 is a longitudinal section through such casket with part of the interior wall broken away. Fig. 3 is a transverse sectional view through the casket, with the top raised, prior to sealing. Fig. 4 is a cross section through one side of the casket prior to the application of the internal and external cement walls showing the inner molds in place. Fig. 5 is a view similar to Fig. 4 after the inner wall has been fixed, and showing the exterior mold in position. Fig. 6 is a detail sectional view with the top in position and showing the bead molds in position ready for final sealing of the casket. Fig. 7 is a detail view of the exterior mold. Fig. 8 is a detail perspective view of the interior mold. Fig. 9 is a detail perspective view of part of the exterior bead or sealing mold. Fig. 10 is a partly sectional view of a casket constructed in accordance with my invention and having a sight opening. Fig. 11 is a detail view showing the sight opening and cover before sealing. Fig. 12 is a detail view of the metallic frame of the sight opening in the cover. Fig. 13 is a detail view showing one mode of attaching a fabric lining to the inside of the casket. Fig. 14 is a similar view showing wooden strips embedded in the inner concrete lining.

In the practical carrying out of my invention I first construct a box 1 of desired dimensions; and preferably make this of galvanized metal, but any suitable metal may be used. I preferably turn the upper edges of this box over a wire bead $1^a$ and within this box and around the bottom edges thereof I secure a reinforcing rod or wire $1^b$. Intermediate the bottom rod $1^b$ and the top wire $1^a$ I may secure vertical rods $1^c$. Across the bottom of the box may be placed other rods $1^d$. Around the sides of the box and attached to the rods I secure a layer of wire fabric 2, preferably of woven wire of any desired mesh, which layer will be separated, or held away, from the sides of the box by the interior wires; and over the bottom of the box and supported by the bottom wires $1^d$ I place a layer $2^a$ of similar fabric. I then line the box with concrete; for this purpose a layer C of concrete of suitable thickness may be first placed in the box to cover the bottom thereof, the concrete or cement being of such consistency when placed in the box as will enable it to flow or pass through the meshes of the reinforcing wire layer $2^a$ which serves as a bond to strengthen the cement. After the bottom is covered with a suitable thickness of cement it may be allowed to set, and when sufficiently hardened I place within the box upon this bottom layer of cement C a removable mold form, which preferably consists of two metallic plates 3, $3^a$, corresponding in depth to the depth of the box and bent at their ends so that when placed together they will correspond in exterior contour to the interior contour of the sides and ends of the box, and be slightly smaller than the interior of the box; and when the mold sections 3, $3^a$ are properly adjusted therein, see Fig. 4, they will be slightly separated from the reinforced layer 2. Then the concrete can be filled in between the mold sections 3, $3^a$ and the inner wall of the box the concrete passing through the wire mesh layer 2 and filling the space between the mold and the inner face of the metallic box as shown at C'. The wire layer 2 bonds the side and end walls of the cement lining C' of the box. In this manner I line the box with a reinforced layer of cement.

The outside of the metal box 1 which is also to be incased in cement, and for the purpose of bonding the cement I preferably attach to the outer side walls of the box vertical wires $1^e$, which may extend under the box as shown at $1^f$. These wires may be attached to the box by solder or other suitable means. The wires $1^e$ preferably do not extend quite to the top of the box and their upper ends are bent outwardly and upwardly for a purpose hereinafter explained. Around the outer side of the box and near the upper edge thereof I preferably attach an upwardly directed metal flange $1^h$ which may be formed of a piece of metal, like that of the box 1, and its lower edge is soldered or otherwise fastened to the box, the upper edge of the flange lies preferably slightly below the top edge of the box and the space between the upper part of this flange and the sides and ends of the box forms a sealing groove hereinafter referred to.

The upper ends of the wires $1^e$, on the outer side and end walls of the box, are preferably bent to approximately conform to the shape of the flange $1^h$ in cross section, but do not contact with said flange. To the wires $1^e$, $1^f$, on the outer side and end walls of the box I secure a reinforcing layer $2^e$, preferably of woven wire netting, I also secure such a reinforcing layer on the bottom of the box; and to the upper outwardly curved edges of the wires $1^e$, $1^f$, I attach strips of wire netting $2^d$.

I then preferably invert the box, as indicated in Fig. 5, and place around the same an exterior mold which is preferably composed of two longitudinal sections 4, $4^a$, adapted when put together to surround the box, said mold sections being of such depth that when they are placed around the box (see Fig. 5) the top edges of the mold sections will project slightly above the bottom of the box (which is then inverted) so that when the mold is completely filled the bottom of the box will be covered, see Fig. 5. The mold 4, $4^a$ should be so arranged that when it is filled the sides of the box will be covered with a coating of concrete $C^2$ of the desired thickness and the bottom with a coating $C^3$, which concrete coatings will be reinforced by the embedded layers of wire netting $2^a$ as shown. The lower edges of the outer mold pieces 4, $4^a$ are preferably bowed or curved as shown at $4^b$ to accommodate the swell of the flange $1^h$ and the upper ends of the rods $1^e$, $1^f$ adjacent the flange $1^h$.

As stated after the mold pieces 4, $4^a$ are in position concrete is filled in between the mold pieces and the box and above the bottom of the box to the desired thickness; and when the concrete is set and the mold pieces removed the box will be incased exteriorly in a reinforced layer of cement. Thus the complete box may be lined interiorly and exteriorly with reinforced concrete walls and a very strong air, moisture water and gas proof box or sarcophagus will be produced.

The cover $1^m$ of the box is preferably made of metal like the box 1, and is provided with a shallow flange $1^n$ on its periphery adapted to fit over the upper edge of the box 1 and into the groove formed between the flange $1^h$ and the upper edge of the box 1, see Figs. 2 and 6. The cover, before being placed in position, may be lined interiorly with concrete as shown at 5, and, if desired this concrete lining of the cover may be reinforced by a layer of wire netting $2^m$ (Fig. 3) in the manner in which the bottom of the box is lined. The inner concrete lining 5 of the cover preferably does not touch the inner sides of the flanges $1^n$ of the cover; but a narrow channel or groove is left between the edges of this concrete lining 5 and the side flanges $1^n$ to enable the cover to be fitted closely onto the box 1 and make a metallic contact between flange 1 and the outer edge of the box or flange $1^h$ as shown. The top of the cover may be also covered with concrete as indicated at $5^a$ and this concrete may be reinforced by means of an internal layer of wire netting which may be placed over transverse and longitudinally disposed wires or rods $1^o$, $1^p$ secured to the top of the box as shown, so that when the cover is coated with concrete such concrete will be reinforced by the internal wire fabric as indicated in Figs. 1, 2 and 3. The coating $5^a$ however should not cover the outer sides of the flanges $1^n$ of the cover.

When the cover and box have been prepared as described and it is desired to seal the casket or sarcophagus, the cover is placed thereover so that the metal edges of the cover fit over the metal edge of the box 1 and into the groove formed by the flange $1^h$, see Fig. 6. The metal flange $1^n$ of the cover and the metal flange $1^h$ of the box may then be securely united by filling the groove in the flange with solder as indicated at $1^s$ in Figs. 2 and 6, thus hermetically and gas tightly uniting and sealing the metal parts of the box and cover.

Mold pieces 6, $6^a$ preferably formed of metal may then be adjusted around the flange $1^h$ (see Fig. 6) but separated therefrom sufficiently to enable the concrete to be worked therebetween so as to form a close joint with the exterior concrete walls of the box and with the concrete wall on the top of the box, and entirely inclose and cover the flange 1ᵇ and the metal joint between the cover and the box. When the mold 6, 6ᵃ is positioned and filled with concrete, a reinforced concrete joint is formed between the exterior concrete walls of the body and the exterior concrete wall of the top, and a solid concrete covering is formed inclosing the box and cover, and when the mold pieces 6, 6ᵃ are removed the result is a finished hermetically sealed reinforced concrete sarcophagus, comprising a sealed metallic casing, lined internally with reinforced concrete and also covered externally every part with reinforced concrete. Preferably the mold pieces 6, 6ᵃ are so formed as to project slightly above the top of the concrete cover 5ᵃ on top of the cover 1ᵐ and the soft concrete is filled in over the cover 5ᵃ as indicated at 5ᵈ, Figs. 1 and 2, thus making a doubly secure concrete seal and connection between the cover and box.

The metal and concrete joints between the cover and box can be easily made by a workman, suitable detachable molds 6, 6ᵃ being provided to enable the concrete seal to be made with a round joint.

If the apparatus is to be used as a sarcophagus to receive an ordinary casket, it can be made more massive and the exterior concrete wall can be made of any thickness desired. Of course such hermetically sealed caskets or sarcophagi can be placed one upon the other without any danger of contamination, and will preserve the contents sealed therein indefinitely; and at the same time on account of great strength will be practically proof against rodents and ghouls.

In some cases the inner reinforced concrete walls might be omitted, but preferably I line the casket both internally and externally as described. Where the casket is to be used in graves the cover may be lowered into position after the box is in place, and then sealed by an attendant. For such cases I preferably embed in the concrete walls soft wire eyes or loops as shown at 7, Figs. 1, 2, 5 and 6, which will enable the covers to be readily manipulated.

When the device is to be used as a casket to receive a body a sign opening may be formed in the cover as indicated in Figs. 10 and 11. In this case a suitable opening is made in the metallic cover 2 and around this opening is secured a frame 8 preferably formed of metal and which retains the glass 8ᵃ in place. Around the inner edge of this flange is an upstanding flange 8ᵇ preferably of metal, having a beading 8ᶜ on its upper edge. Secured to the outside of and around the upper part of flange 8ᵇ is a bent metal flange 8ᵈ which protects the upper outer edge of the flange 8ᵇ from the concrete, similar to the way in which the flange 1ᵇ protects the upper edge of the box 1.

A metallic cover 9 is provided to close the sight opening, and this cover 9 has a depending metal flange 9ᵃ which is adapted to fit over the upper edge of the flange 8ᵇ and within the flange 8ᶜ just as the flanges of the main cover 2 are adapted to fit over the edges of the box 1. The metallic edges of the flange 9ᵃ of the cover may be soldered to the metal flange 8ᵇ, 8ⁿ, around the sight opening, in the manner in which the cover 2 is sealed to the box 1. The cover 9 may be lined internally and externally with concrete like the cover 2 as above explained; and when the cover 9 is in place and sealed all is inclosed in the final coating of concrete 5ᵈ, as above described.

If it is desired to line the casket with fabric, wooden strips 10 may be attached to the inner sides of the box 1 as indicated in Figs. 13 and 14. Any number of these wooden strips may be secured to the sides and ends of the box by means of wire or metal loops 10ᵃ which may be soldered direct to the box 1 as indicated in Fig. 13. If the box is to be lined with concrete these strips may be made of such thickness that their inner faces will be flush with the inner face of the concrete; or wooden pieces 10 may be embedded in the inner layer C' of the concrete as indicated in Fig. 14.

I have in the drawings simply indicated conventionally the construction of the interior molds, the exterior molds, and the heading or sealing molds for forming the concrete walls or linings of the box; and these molds could be made either of wood or metal; but the essential features and requirements thereof will be readily appreciated when the construction of the casket is understood.

What I claim is:

1. In a casket or sarcophagus, a metal box having an exterior flange around its upper edge, a reinforced concrete lining, and a reinforced concrete coating covering the exterior side, end and bottom walls of the box, and also covering the exterior wall of the flange.

2. The herein described sarcophagus comprising a metal box having a concrete coating on its inner walls and bottom; and a concrete coating on its exterior bottom, side end end walls; with a metal cover having a flange adapted to engage the top of the box, and be fastened thereto, said cover having a concrete lining and an exterior concrete coating; and a concrete seal covering the joint between the top and box and uniting the exterior concrete coatings of the box and cover.

3. A sarcophagus comprising a metal box having an exterior flange around its upper edge, a metal cover having a flange adapted to engage the flange on the box, a concrete coating on the exterior side, end and bottom walls of the box, a concrete coating on the top of the cover, and a concrete coating covering the joint between the top and box and inclosing the flange of the box and uniting the exterior concrete coatings of the box and cover.

4. A sarcophagus comprising a metal box having an exterior flange around its upper edge, a metal cover having a flange adapted to engage the flange on the box; a concrete lining covering the interior side, end and bottom walls of the box, and a concrete lining covering the interior surface of the top; a concrete coating on the exterior side, end and bottom walls of the box, an exterior concrete coating on the cover, and a concrete coating inclosing the flange of the box and uniting the exterior concrete coatings of the side and end walls of the box and cover.

5. A casket or sarcophagus comprising a box having an exterior metal flange around its upper edge, an exterior concrete coating covering the side, end and bottom walls of the box; a top having a depending flange, and an external concrete covering, the metal flange of the top being adapted to fit the metal flange of the box and sealed thereto, and a concrete seal covering the metal flanges of the box and cover.

6. A casket or sarcophagus comprising a metal box having an exterior metal flange around its upper edge, and exterior concrete coating covering the side, end and bottom walls of the box and the outside of the flange; a metal top having a depending metal flange, and an external concrete coating covering the top; the metal flange of the top being fitted to the metal flange of the box and sealed thereto; with a concrete seal covering the metal flanges of the box and cover and uniting the outer concrete coverings of the box and cover.

7. A casket or sarcophagus comprising a metal box having an exterior metal flange around its upper edge, a reinforced concrete lining, and an exterior reinforced concrete coating covering the side, end and bottom walls of the box and exterior surface of the flange; a metal top having a depending metal flange, an internal reinforced concrete lining and an external reinforced concrete covering; the metal flange of the top being adapted to be fitted to the metal flange of the box and sealed thereto; and a concrete seal covering the metal flanges of the box and cover and uniting the outer concrete coverings of the box and cover.

8. A sarcophagus comprising a metal box having an exterior metallic flange around its upper edge, a metal cover having a metal flange adapted to engage the flange on the box; a reinforced concrete lining covering the interior side, end and bottom walls of the box; a reinforced concrete lining covering the interior surface of the top; a reinforced concrete layer covering the exterior side, end and bottom walls of the box; a reinforced concrete coating covering the exterior of the cover; and a concrete coating covering the metallic joint between the flanges of the top and box and uniting the exterior concrete coatings of the side and end walls of the box and cover.

In testimony that I claim the foregoing as my own, I affix my signature in presence of two witnesses.

LAFAYETTE T. BOW.

Witnesses:
C. T. VERNON,
W. L. SMITH.